United States Patent [19]

Hohman et al.

[11] Patent Number: 4,588,429
[45] Date of Patent: May 13, 1986

[54] METHOD OF HEATING PARTICULATE MATERIAL WITH A PARTICULATE HEATING MEDIA

[75] Inventors: Charles M. Hohman; Mark A. Propster, both of Granville; Stephen Seng, Frazeysburg, all of Ohio

[73] Assignee: Owens-Corning Fiberglas Corporation, Toledo, Ohio

[21] Appl. No.: 676,466

[22] Filed: Nov. 29, 1984

Related U.S. Application Data

[63] Continuation-in-part of Ser. No. 633,682, Jul. 25, 1984, abandoned, which is a continuation of Ser. No. 556,767, Dec. 1, 1983, abandoned, which is a continuation of Ser. No. 492,311, May 6, 1983, Pat. No. 4,425,147, which is a continuation of Ser. No. 330,064, Dec. 14, 1981, Pat. No. 4,386,951, which is a continuation of Ser. No. 181,589, Aug. 27, 1980, Pat. No. 4,319,903.

[51] Int. Cl.⁴ .............................................. C03B 1/00
[52] U.S. Cl. ........................................ 65/27; 65/335; 165/1; 165/88; 432/118; 201/33; 202/100; 202/216

[58] Field of Search ................. 65/27, 335; 165/1, 88, 165/111 DC, 111; 432/118; 202/100, 216; 201/33

[56] References Cited

U.S. PATENT DOCUMENTS

| 4,207,943 | 6/1980 | Gardner et al. | 165/1 |
| 4,401,453 | 8/1983 | Propster et al. | 65/27 |
| 4,436,588 | 3/1984 | Rammler et al. | 201/33 |

*Primary Examiner*—Arthur Kellogg
*Attorney, Agent, or Firm*—Ronald C. Hudgens; Patrick P. Pacella

[57] ABSTRACT

Apparatus and method for the heat processing of granular materials by the counterflow of the granular material and preheated particulate heat exchange media through a processing drum rotatable about an inclined axis. The hot media is intimately mixed with the granular material internally of the drum to heat the material and to cool the media. Various arrangements are disclosed to recover the heat imparted to the material, or to utilize the media for successive heating operations, or to recover waste heat from other related heat processing operations or to utilize the material as preheated by the media.

7 Claims, 5 Drawing Figures

FIG. 5

METHOD OF HEATING PARTICULATE MATERIAL WITH A PARTICULATE HEATING MEDIA

This is a continuation-in-part of application Ser. No. 633,682 filed July 25, 1984, which is a continuation of application Ser. No. 556,767 filed Dec. 1, 1983, both now abandoned, which is a continuation of application Ser. No. 492,311 filed May 6, 1983, now U.S. Pat. No. 4,425,147 issued on Jan. 10, 1984, which is a continuation of application Ser. No. 330,064 filed Dec. 14, 1981, now U.S. Pat. No. 4,386,951 issued on June 7, 1983 which is a continuation of Ser. No. 181,589 filed Aug. 27, 1980, now U.S. Pat. No. 4,319,903 issued on Mar. 16, 1982.

TECHNICAL FIELD

This invention relates to a process or apparatus for heating or drying granular material with heat transfer media.

BACKGROUND ART

The use of rotary drums for the preheating of glass batch prior to its introduction into a glass melting furnace has been proposed in several patents issued to the assignee of this invention. For example, see U.S. Pat. Nos. 4,319,903 and 4,409,011. In each of these patents, the particulate glass batch is introduced into the upper end of a drum which is rotatable about an inclined axis and a heat exchange medium, such as alumina balls, are introduced into the other, lower end of the drum. The alumina balls are preheated, preferably with the exhaust gases from a glass melting furnace, and the countercurrent flow of the glass batch and heated balls through the drum preheats the glass batch prior to its introduction into the glass melting furnace. The preheated batch is removed from the perforate lower end of the inclined drum, and the cooled media is elevated interiorly of the drum by means of a scroll to be discharged axially of the drum at the upper end of the drum.

DISCLOSURE OF INVENTION

The present invention now proposes the utilization of rotary drums for the heat processing of particulate material for several, varied purposes which are distinct from the heating of glass batch preparatory to introduction into a glass melting furnace.

Generally, the particulate material to be heat processed is flowed in a countercurrent direction to the flow of the larger hot media, so that the heat from the media is imparted to the particulate material. Where the heat treatment consists of drying the material, the water is driven off in the drum. Where the material being dried is incendiary or self-igniting, as where coal is being dried, a draft of a non-oxidizing gas is swept through the drum, both to prevent ignition and to remove the water vapor.

The dried, hot, particulate material can be used hot as where hot, dried coal is introduced into a coal-fired power generating plant. Where the material need not be hot, the dried material and the media are circulated through a second recovery drum to recover the residual heat in the dried material to reheat the media prior to its reintroduction into the heating hopper.

Further heat conservation can be obtained by utilizing the reheated media to preheat the combustion air utilized in the media preheating combustion burner.

By adopting these techniques, the heat processing of particulate material by utilizing preheated heat exchange media can be adapted to a large number of industrial processes to improve the processes themselves and to improve the heat efficiency of the processes. For example, the drying of coal from a coal slurry pipeline can be effected with the hot coal being supplied to a coal-fired power generating plant. Wet sand can be dried for utilization in glass making processes and the like, and the residual heat recovered from the sand by utilization of a second drum, so that the heat efficiency of the process can be increased to about 70%. Another example resides in the counterflowing of cement raw materials and heated media within successive drums to carry out preliminary heat processing steps in a cement process, e.g., the dehydration and calcining steps usually performed in a rotary kiln. Another example is the performance of consecutive carbonization steps in individual, successive inclined drums during the manufacture of metallurgical coke by the so-called continuous process for making formcoke.

BRIEF DESCRIPTION OF THE DRAWINGS

FIG. 1 is a schematic drawing of a heat processing apparatus and method of the present invention, as adapted for the drying of sand or the like.

BEST MODE OF CARRYING OUT THE INVENTION

INDUSTRIAL APPLICABILITY

THE EMBODIMENT OF FIGURE I

Figure 1:
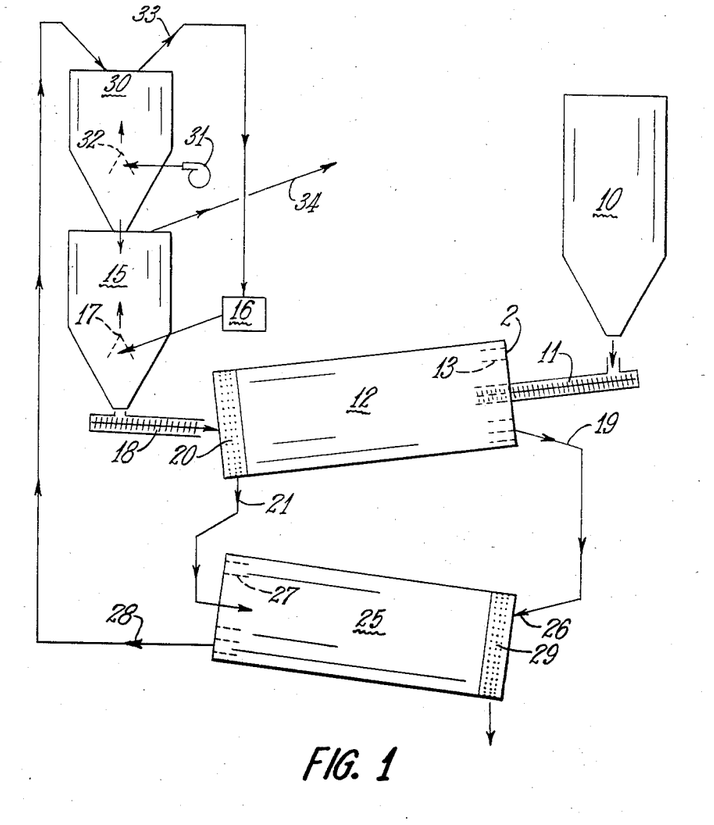

FIG. 1 is an illustration of a system of the present invention for drying a wet, granular material, such as sand containing 10 to 15% moisture. The wet sand is stored in a hopper 10 and is fed by feed screw 11 into the upper end 2 of an inclined cylindrical heating drum 12 of the type disclosed in U.S. Pat. No. 4,319,903. The drum 12 is rotatable about an inclined longitudinal axis and is provided with an inner scroll 13, the feed screw 11 extending axially of the drum 12 to discharge into the drum 12 inwardly of the scroll 13.

Preheated media, such as alumina balls of about 1" diameter manufactured by Coors Porcelain Company, Golden, Colo., and containing from 90% to 99.5% alumina oxide, is stored in a preheat hopper 15. The balls in the hopper 15 are preheated by means of a combustion air burner 16, the combustion gases of which are fed into the hopper 15 beneath a deflection wedge 17 to heat the hopper contents to a temperature on the order of 700° F.

The heated alumina media is fed by suitable means, as by a feed screw 18, from the hopper 15 axially into the lower end of the drum 12. As the drum 12 rotates, the media flows through the drum toward the scroll 13 as the wet sand flows in the reverse direction, i.e., downwardly, through the drum, the two materials being intimately mixed in effective heat exchange relation interiorly of the drum. The alumina media gives up its heat to the wet sand 11, drying the sand and evaporating the water therefrom. The media is discharged from the drum through a chute 19 receiving the media from the scroll 13, and the dry, hot sand at a temperature of about 600° F. and containing 1% or less of water is discharged through the perforate lower region 20 of the drum 12, as indicated by the directional arrow 21.

The dry, hot sand from the heating drum 12 is introduced into the upper end of a heat recovery drum 25 identical to the drum 12 for flow downwardly through the drum in countercurrent flow relation to the cool media introduced into the lower end of the heat recovery drum 25, as at 26. The hot, dry sand and the cool media are mixed in intimate heat transfer relation within the heat recovery drum 25, with the media being heated by the hot, dry sand for discharge through the scroll 27 as indicated by the directional arrow 28 at a temperature of about 400° to 500° F. The sand, having given up most of its heat to the media internally of the drum 26, is discharged at a temperature of about 200° F. or less through the perforate end 29 of the drum 25.

The media discharged into the line 28 is conveyed to an upper preheat air hopper 30 for flow through the hopper 30 into the preheat media hopper 15. Air at atmospheric or ambient temperature is introduced from a blower 31 through the wedge 32 into the hot media within the hopper 30 to be preheated by the media through which the air flows upwardly. The preheated air at a temperature of about 350° F. to 450° F. flows from the hopper 32, as indicated by the directional arrow 33, to be utilized as heated combustion air in the burner 16. The output of the combustion burner 16 is then introduced through the wedge 17 to preheat the media in the media hopper 15, as above explained, to a temperature of about 700° F. Residual combustion air from the hopper 15 is discharged through an exhaust line 34 at a temperature of about 200° to 300° F.

By utilizing the method and apparatus illustrated in FIG. 1 of the drawings, it will be appreciated that the cold wet sand or similar granulated material in the hopper 10 is dried in the drum 12 by means of the preheated media from the hopper 15, and the residual heat in the hot dry sand is recovered in the recovery drum 25, so that dry sand at a temperature of about 200° F. or less is discharged from the recovery hopper 25. The residual heat in the media discharged at 28 from the recovery drum 25 is utilized to preheat the combustion air for the combustion burner 16 to aid in preheating the media as it is recirculated back to the drum 26 to heat additional and subsequent cold, wet sand.

THE EMBODIMENT OF FIG. 2

Figure 2:
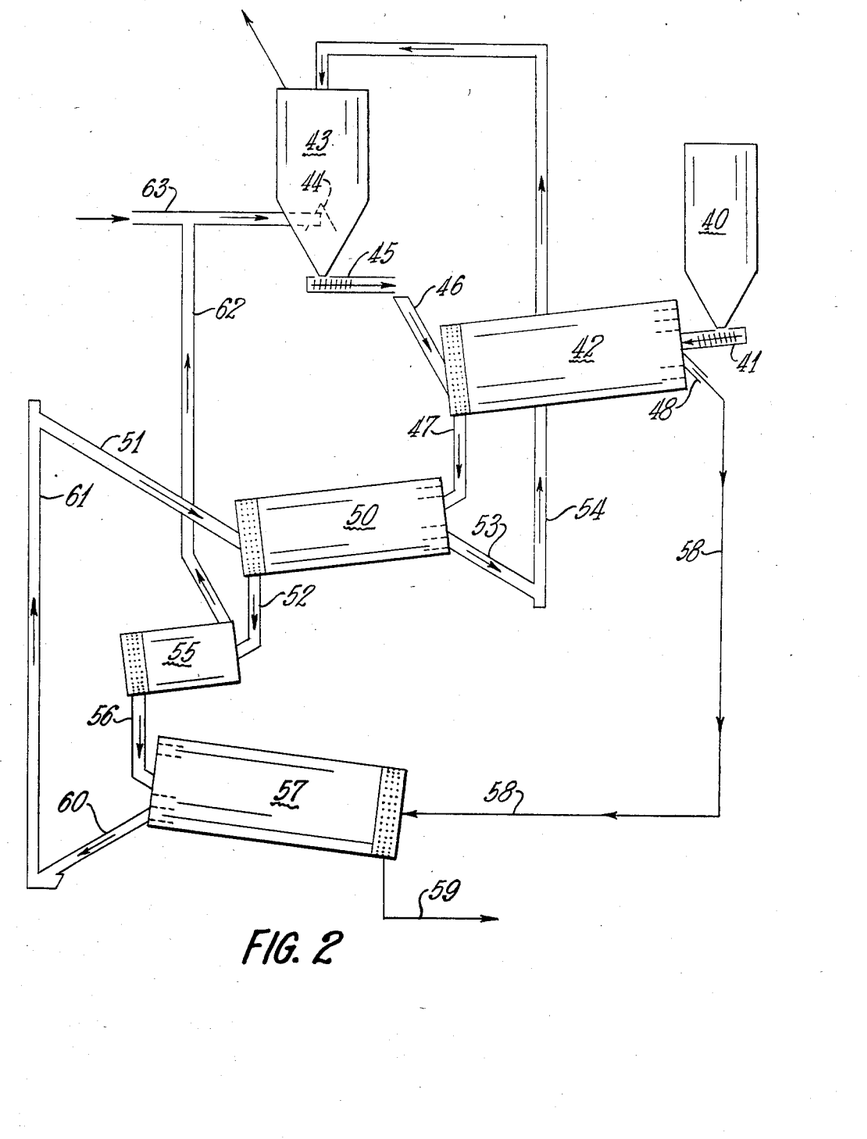
FIG. 2 is a schematic drawing of a cement manufacturing apparatus and process utilizing the heat processing apparatus and method of the present invention.

Illustrated in FIG. 2 of the drawings is a cement making process wherein cement-forming raw materials are dehydrated and calcined by the utilization of the heat processing method and apparatus of the present invention.

More specifically, reference numeral 40 refers to a hopper containing the raw materials for the manufacture of Portland cement. Typically, the ingredients and proportions of raw materials include limestone, seashells, moral or chalk to provide the calcareous components; clay, shale, slate or sand to provide silica and alumina; and iron ore, mill scale or the like to provide the requisite iron. The raw materials are calculated to provide a cement having a typical composition as follows:

| Oxide | Weight Percent |
| --- | --- |
| CaO | 64.4 |
| $SiO_2$ | 22.2 |
| $Al_2O_3$ | 3.5 |
| $Fe_2O_3$ | 2.9 |
| MgO | 2.2 |
| $SO_3$ | 2.0 |

The dry, cold ingredients from the hopper 10 are fed by suitable means, as by a screw conveyor 41, into the upper end of a dehydration drum 42 which is cylindrical and which is rotatable about an inclined axis, as explained in connection with FIG. 1 of the drawings. A media hopper 43 contains a supply of alumina balls or similar heat exchange medium which has been preheated to a temperature of about 450° F. by means of waste heat gases fed into the hopper beneath a deflection wedge 44. The media at its temperature of about 450° F. is conveyed by a screw conveyor 45 and a chute 46 into the lower end of the drum 42.

As the drum 42 rotates, the cement ingredients in the drum 42 are heated by the hot media to a temperature of about 300° to 400° F. prior to their discharge through the drum from the lower end of the drum, as through discharge chute 47. The media is discharged at a temperature on the order of 200° F. from the scroll located at the upper end of the dehydration drum 42, as through chute 48. Any free water present in the raw ingredients is evaporated within the dehydration drum 42, and the ingredients are preheated for the next successive calcining step which is carried out within drum 50.

The drum 50 receives the dehydrated and preheated ingredients through the chute 47. Further, the drum receives media at a temperature of about 2400° F. from a chute 51, this media having been preheated in a manner to be hereinafter more fully described.

The ingredients within the drum 50 are heated to a temperature on the order of 1800° F. to evolve any combined water from the clay ingredients, to evolve carbon dioxide from the limestone ingredient, and to initiate calcination with the formation of dicalcium silicate. Thus, the ingredients which are discharged from the drum 50 through the discharge chute 52 have been at least partially calcined to form dicalcium silicate. The media which issues from the drum 50 is returned, via conveyors 53 and 54, back to the media hopper 43 for reheating. The media issuing from the drum 50 is at a temperature of about 300° to 400° F.

The calcined ingredients from the hopper 50 are fed through the conveyor 52 to a clinker kiln 55. The clinker kiln 55 is far shorter than the conventional kiln, since the dehydration and calcination steps (which are conventionally performed in the kiln) have been previously carried out in the drums 42 and 50. The kiln 55 is heated in the conventional fashion by an axial flow burner (not shown) to a temperature on the order of 2650° F. The materials entering the kiln 52 are first converted at temperatures ranging from 2000° to 2200° F. into tricalcium aluminate and tetracalcium aluminoferrite, and subsequently at a temperature of from 2300° to 2650° F., tricalcium silicate is formed with the progressive disappearance of free lime, resulting in the formation of conventional Portland cement. In the hottest zone of the clinker kiln, the lime-rich mixture containing silica, alumina and ferric oxide, with small percentages of other oxides, is heated to its sintering temperature and becomes viscous. This is called clinkerizing, and is manifested by the liquifying of the clinker constituents.

Further, once clinkerizing has been completed, the clinkers are initially cooled internally of the kiln at the lower discharge end of the kiln beyond the location of the burner. Typically, the clinkers will be cooled to a temperature on the order of 2400° to 2500° F.

The clinkers are discharged from the kiln 55 through a discharge chute 56 into a cooling drum 57, with the cooled media at a temperature of about 200° F. from the discharge chute 48 of the drum 42 being introduced through a conveyor 58 into the lower end of the drum 57. The clinkers in the drum 57 are cooled by their contact with the relatively cold media, and the media is heated by its contact with the much hotter clinkers. The cement is discharged from the drum 57 through a discharge line 59 at a temperature of about 200° to 300° F., while the media is heated by the clinkers to a temperature of about 2300° to 2400° F., at which temperature the media is discharged from the drum 57 through the discharge line 60.

The heated media from the drum 57 is conveyed by the discharge line 60 and conveyor 61 to the chute 57 by means of which the media at its elevated temperature of 2300° to 2400° F. is introduced into the calcining drum 50. The excess heat from the kiln 55 is conveyed by a conduit 62 to the hopper 43 where the hot combustion gases are introduced beneath the wedge 44 to heat the media in the hopper 43 to the desired temperature. To accurately control the temperature of the combustion gases introduced beneath the wedge 44, dilution air may be added through a valve controlled dilution air passage 63.

From the foregoing description, it can be readily seen that the heat processing techniques of the present invention may be readily adapted to the cement manufacturing process to carry out the preliminary dehydrating and calcining steps of the cement manufacturing process by the utilization of waste heat from the relatively brief clinker kiln operation, and without the necessity of adding any external heat. The media particles are heated solely by waste heat from the clinker kiln operation, and waste heat from the clinkers themselves are recovered by the particulate media to carry out the calcination process. Thus, the media can be utilized to recover waste heat from previously heated granular material (in this case, the cement clinkers) in order to carry out other steps in the process (in this case, the calcination step). Thus, by the utilization of the particulate media, waste heat can be recovered from granular materials.

THE EMBODIMENTS OF FIGS. 3 AND 4

Figure 3:
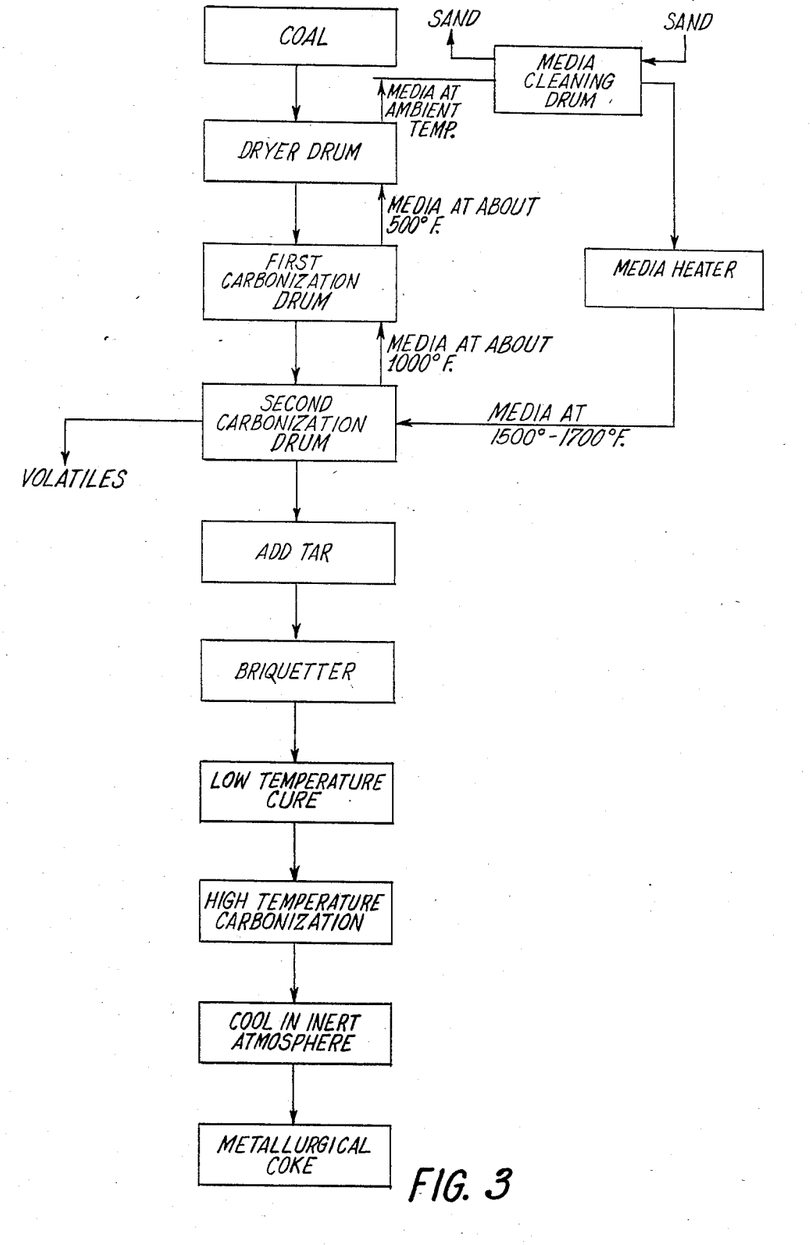
FIG. 3 is a flow diagram of a process for making metallurgical coke utilizing the method and apparatus of this invention.
Figure 4:
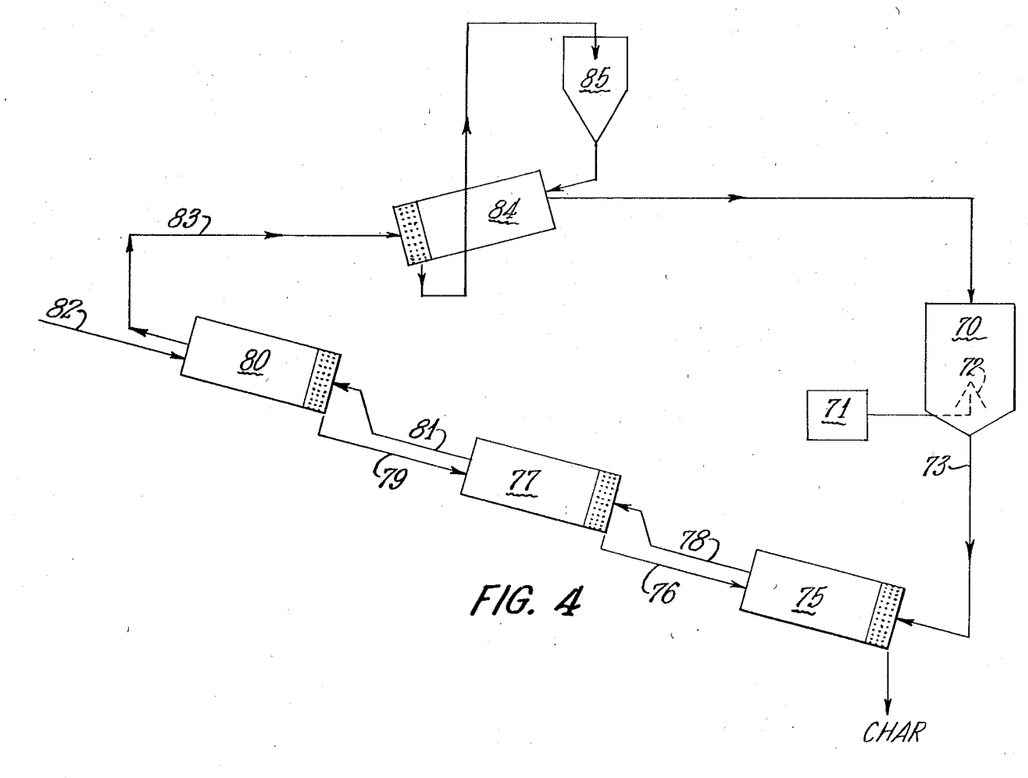
FIG. 4 is a schematic drawing of that portion of the procecss of FIG. 3 which utilizes the present invention.

To further illustrate the industrial utilization of the heat recovery process of this invention, FIGS. 3 and 4 incorporate the invention into a continuous coking process of the type which is described in "The Making, Shaping and Treating of Steel," published by U.S. Steel Corporation, 1971, edited by Harold E. McGannon, at page 105.

As illustrated in FIG. 3 of the drawings, a flow chart of the process is presented. As shown, coking coal at ambient temperature is introduced into a dryer drum where it is dried at a temperature on the order of 500° F. and in the presence of steam or air, if necessary, to prevent agglomeration during later processing. From the dryer drum, the coal is introduced into a first carbonization drum where it is heated at a temperature on the order of 1000° F. and then into a carbonization drum where it is heated to a temperature on the order of 1500° F. Subsequently, tar is added to the carbonized coal to air in briquetting the coal. The briquetted coal then is subjected to a low temperature carbonization and to a high temperature carbonization, following which the coked coal is cooled in an inert atmosphere to form metallurgical coke or "formcoke."

As illustrated in FIG. 3, alumina media balls of the type hereinbefore described are heated in a hopper to a temperature on the order of 1500° to 1700° F. The media is then circulated to the second carbonization drum, then to the first carbonization drum, and then to the dryer drum, following which the media flows through a media cleaning drum into which sand is introduced as the cleaning medium. The cleaned media is then reintroduced into the media heating drum.

The apparatus for carrying out the drying and carbonization steps of the flow chart of FIG. 3 is schematically illustrated in FIG. 4 of the drawings. In FIG. 4, reference numeral 70 refers to a media heating hopper in which the appropriate media is stored and is heated by means of a combustion burner 71 which introduces combustion products from the burner beneath the deflecting wedge 72. The media is heated to a temperature of 1500° to 1700° F. in the hopper 72, and the hot media is introduced into the lower end of a first inclined drum 75 which serves as the second carbonizing drum of FIG. 3.

The carbonizing is carried out at a temperature on the order of 1500° to 1700° F. within the carbonizing drum 75 upon the partially carbonized coal introduced through line 76 from a first carbonizing drum 77. The material from the first carbonizing drum 77 introduced into the second carbonizing drum 75 through the line 76 is at a temperature on the order of 1000° F. and media at a temperature on the order of 1000° to 1200° F. is conveyed to the first carbonizing drum from the second carbonizing drum through conduit 78. The first carbonizing drum receives dehydrated coal at a temperature of about 500° F. through line 79 from the dehydrating drum 80, and media at a temperature of 500° to 700° F. is introduced into the dehydrating drum 80 through line 81 from the first carbonizing drum.

Wet coal at ambient temperature is introduced into the dehydration drum 80 through a feedline 82 and cool media, at a temperature ranging from about ambient to about 200° F. is returned to the media drum 70 through a return line 83.

It will be noted from FIG. 3 that some volatile constitutents evolve from the carbonized coal, particularly during the performance of the second carbonizing step. These volatile products include gas and vapors which ordinarily evolve at temperature in the range of 1100° to 1300° F. Such volatiles include gases, oils and tars of various descriptions. In the event that some of these constituents might adhere to the media, the media is cleaned prior to its return to the media heating hopper by flowing the media through a rotary drum 84 while a dry, particulate material, such as sand, is also circulated through the drum in a countercurrent direction to abrade and scrub from the media any of the volatile components which might be adhered thereto. The sand circulated through the drum 84 is stored in an overhead hopper 85 and is simply circulated to and from the drum in the manner hereinbefore described in detail.

THE EMBODIMENT OF FIG. 5

Figure 5:
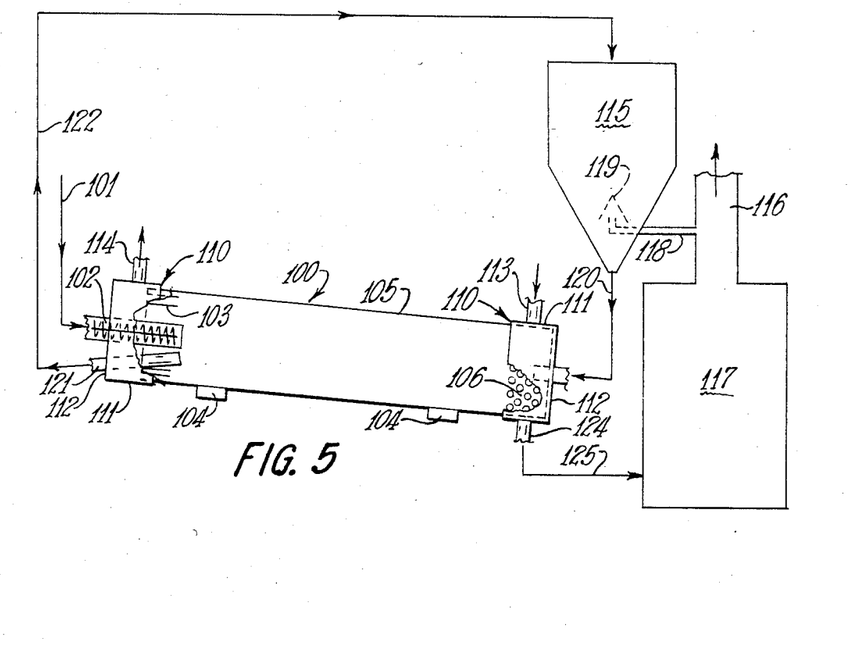
FIG. 5 is a schematic drawing of a coal drying and preheating process of the present invention.

In FIG. 5 of the drawings, still another embodiment of the present invention is illustrated, this embodiment being particularly adapted for the preheating of coal for introduction into a coal fired power station.

The coal is delivered in pulverant form which may contain appreciable moisture, as where the coal has been piped to the site in a slurry pipeline, and the coal is introduced into a drum 100 through a coal introduction line 101 terminating in a feed auger 102 adapted to feed the coal axially into the drum centrally of the scroll 103 located internally of the drum.

As shown in FIG. 5, the drum 100 is of somewhat different design than those drums hereinbefore described, the drum 100 consisting of a central cylindrical section 105 rotatable about its longitudinal axis on rollers 104 and equipped with the interior media elevating scroll 103 at its upper end and having a perforate particulate material removal section 106 at its lower end. Indentical fixed end caps 110 cover the open ends of the drum midsection 105, each such end cap including a fixed cylindrical wall 111 within which the exterior periphery of the drum midsection 105 is snugly received and a radial end wall 112 based from the adjacent end of the drum section 105 to establish communication between the interior of the cap 110 and the interior of the drum section 105. The caps 110 are sealed to the drum 100 by suitable means, not shown. A gas conduit 113 provides a means whereby gas can be injected into the interior of the drum 100 through the end caps, the gas leaving the drum through the outlet 114.

A media hopper 115 containing a body of generally spherical media as utilized elsewhere in the present invention and receives waste heat from the exhaust stack 116 of a coal fired power station 117. The waste heat flows through the line 118 to be introduced into the hopper beneath the deflection wedge 119 to heat the media prior to its introduction through line 120 into the upper end of the drum 100. The hot media flows upwardly through the drum 100 to issue through the return chute 121 for return through conduit 122 to the hopper 115. The coal which is introduced through the feed screw 102 flows downwardly through the drum in intimate heat transfer relation to the media flowing therethrough, the coal issuing through the apertured section 106 of the drum 100 and exit conduit 124 to be conveyed through conduit 125 to the coal fired power station at an elevated temperature.

To avoid combustion of the coal as it is heated in the drum 100, an inert gas such as nitrogen, carbon dioxide, or similar non-oxidizing gas, is introduced into the lower end cap 110 for flow through the drum 100 and through the other end cap 119 carrying with it any moisture, air flotable coal fines or the like material from the interior of the drum.

The coal is both dried and preheated by the media, so that the combustion efficiency in the power plant is increased, yet only waste heat is required for preheating the coal.

We claim:

1. The method of heat processing a granular material comprising the steps of:
   (a) heating a body of particulate heat transfer media in a hopper to a processing temperature T1;
   (b) flowing hot media from said hopper and at said temperature T1 upwardly through a processing drum rotatable about an inclined axis with the media being removed from the upper end of the drum, while simultaneously flowing the granular material to be processed downwardly through the drum for removal from the lower end of the drum, the granular material and the media being in intimate heat transfer contact during their counterflow through the drum to heat the granular material to a processing temperature T2, with the media issuing from the drum at a temperature T3 which is less than either of the temperatures T1 and T2;
   (c) introducing the media from the processing drum at the temperature T3 into the upper end of a heat recovery drum rotatable about an inclined axis and simultaneously introducing the granular material at the temperature T2 into the lower end of said heat recovery drum, counterflowing the granular material and the media through the heat recovery drum, removing the granular material from the lower end of the drum at a temperature which is less than the temperature T2 and removing the media from the upper end of the drum at a temperature T4 which is greater than the temperature T3; and
   (d) returning the media to said hopper at the temperature T4 for reheating to its processing temperature T1.

2. The method of heat processing a granular material comprising the steps of:
   (a) heating a body of particulate heat transfer media in a hopper to a preheat temperature;
   (b) flowing hot media from said hopper and at said preheat temperature upwardly through a processing drum rotatable about an inclined axis with the media being removed from the upper end of the drum, while simultaneously flowing the granular material to be processed downwardly through the drum for removal from the lower end of the drum, the granular material and the media being in intimate heat transfer contact during their counterflow through the drum to heat the granular material to a processing temperature, with the media issuing from the drum at a temperature which is appreciably less than the preheat temperature;
   (c) introducing the media from the processing drum into the upper end of a heat recovery drum rotatable about an inclined axis and simultaneously introducing the granular material at the processing temperature into the lower end of said heat recovery drum, counterflowing the granular material and the media through the heat recovery drum to cool the granular material and to reheat the media to a temperature greater than the temperature of the media as it issues from the processing drum, removing the granular material from the lower end of the drum and removing the media from the upper end of the drum; and
   (d) returning the media to said hopper at the temperature for reheating to the processing temperature.

3. An apparatus for heat processing a granular material by admixture with larger, preheated particulate media and for subsequently partially recovering the processing heat, comprising:
   (a) means for reheating the media;
   (b) an inclined processing drum rotatable about an inclined longitudinal axis and having a media removing scroll at its upper end, means for introducing granular material at substantially ambient temperature into the upper end of the drum, means for introducing hot particulate media from said heating means into the lower end of the drum, and means for rotating the drum with the particulate material and the media in intimate heat transfer contact with heated particulate material issuing from the lower end of the drum and cooled media issuing from the scroll at the upper end of the drum;

(c) a second inclined heat recovery drum also rotatable about an inclined longitudinal axis, said heat recovery drum having means for introducing the hot granular material into the upper end of the drum, means for introducing cooled media into the bottom end of the drum, means for rotating the heat recovery drum with the hot granular material in intimate heat transfer contact with the relatively cold media, means including a scroll for removing heated media from the upper end of the heat recovery drum, and means for removing relatively cooler granular material from the lower end of the heat recovery drum; and (d) means for recirculating the preheated media back to the media heating apparatus.

4. In a method for heat processing a granular material by admixture with a relatively hot particulate media and for partially recovering the processing heat, the steps of:

(a) heating the media to a temperature in excess of the processing temperature;

(b) serially flowing the media and the material through a pair of consecutive rotatable drums, the media and the material flow being in countercurrent directions through each drum;

(c) maintaining intimate heat transfer contact between the material and the media in the first drum to heat the material to the desired processing temperature, with the media issuing from the first drum at a temperature substantially less than the desired processing temperature;

(d) maintaining intimate heat transfer contact between the material and the media in the second drum to cool the material and to heat the media to a temperature intermediate the temperature at which it issued from the first drum and the desired processing temperature; and (e) reheating the media to a temperature in excess of the processing temperature preparatory to reintroducing the media into the first drum.

5. In a method for heat processing granular material by means of recirculated, generally spherical media of a size larger than the granular material, the improvements of:

(a) initially heating the media to a temperature $T1$ in excess of the desired processing temperature $T2$;

(b) providing a pair of drums, each rotatable about an inclined axis;

(c) serially introducing media into said drums for successive flow therethrough and serially introducing granular material into said drums for successive flow therethrough in a direction countercurrent to the direction of media flow, the granular material and the media being in intimate heat transfer relation interiorly of each drum;

(d) the hot media introduced in the first drum heating the material to the desired processing temperature $T2$ interiorly of the first drum, and the heated material introduced into the second drum at substantially the temperature $T2$ preheating the media interiorly of the second drum to a temperature $T3$ which is less than either $T1$ or $T2$;

(e) returning the media from the second drum for reheating to the temperature $T1$; and (f) issuing the previously heated material from the second drum at a temperature $T4$ which is less than any of the temperatures $T1$, $T2$ and $T3$.

6. In a method of heating a granular material to be heat processed to a plurality of different, successively greater processing temperatures, the steps of:

(a) heating particulate heat exchange media to a temperature at least as great as the maximum processing temperature;

(b) flowing the material in a first direction through successive, individual processing drums for processing at successively greater temperatures;

(c) flowing the media through said drums in succession, but in a direction countercurrent to the first direction of flow of said material, the media flowing through the drums to heat the material therein to successively lower temperatures;

(d) the media issuing from the drum into which the material is first introduced at a temperature on the order of ambient temperature; and (e) reheating the media from said first drum by the performance of step (a).

7. In a process for (a) heating a granular material by admixture with pre-heated media and (b) recovering a portion of the heat content of the heated granular material, the steps of:

1. serially introducing granular material and media into a pair of rotary heat exchange drums for intimate heat transfer contact interiorly of the successive drums; wherein material flow through said drums is in a direction countercurrent to the direction of media flow;

2. pre-heated media contact in one of said drums heating the material by heat transfer contact;

3. pre-heated material in the other of said drums heating the media and cooling the previously pre-heated material to a temperature on the order of ambient temperature; and 4. recycling the heated media.

* * * * *